(12) United States Patent
Yu et al.

(10) Patent No.: US 11,532,286 B2
(45) Date of Patent: Dec. 20, 2022

(54) BACKLIGHT MODULE, DISPLAY DEVICE AND CONTROL METHOD THEREOF

(71) Applicants: Chongqing BOE Optoelectronics Technology Co., Ltd., Chongqing (CN); BOE Technology Group Co., Ltd., Beijing (CN)

(72) Inventors: Pingjia Yu, Beijing (CN); Sijun Lei, Beijing (CN); Yansheng Sun, Beijing (CN); Shanbin Chen, Beijing (CN); Yuxu Geng, Beijing (CN); Yong Deng, Beijing (CN); Hebing Ma, Beijing (CN); Chaojie Zhang, Beijing (CN)

(73) Assignees: Chongqing BOE Optoelectronics Technology Co., Ltd., Chongqing (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 17/458,185

(22) Filed: Aug. 26, 2021

(65) Prior Publication Data

US 2022/0093049 A1 Mar. 24, 2022

(30) Foreign Application Priority Data

Sep. 24, 2020 (CN) .......................... 202011019533.6

(51) Int. Cl.
*G09G 3/34* (2006.01)
*G09G 3/36* (2006.01)
(Continued)

(52) U.S. Cl.
CPC ......... *G09G 3/3426* (2013.01); *G02B 6/0068* (2013.01); *G02B 6/0073* (2013.01);
(Continued)

(58) Field of Classification Search
CPC .. G09G 3/3426; G09G 5/10; G09G 2320/028; G09G 2320/068;
(Continued)

(56) References Cited

U.S. PATENT DOCUMENTS

2009/0067156 A1* 3/2009 Bonnett ................ G02F 1/1323
362/97.2
2012/0176404 A1* 7/2012 Broughton ........... G09G 3/3611
345/619
(Continued)

FOREIGN PATENT DOCUMENTS

CN 204790254 U 11/2015
CN 106297674 A 1/2017
(Continued)

OTHER PUBLICATIONS

CN2020110195336 first office action.

*Primary Examiner* — Antonio Xavier
(74) *Attorney, Agent, or Firm* — IPro, PLLC

(57) ABSTRACT

The present disclosure relates to a backlight module, a display device and a control method thereof. The display device includes a first edge, a second edge, and N display areas. The N display areas are disposed between the first edge and the second edge and are arranged along the first direction; the first edge and the second edge are arranged along the first direction; the method includes: in response to a first control instruction for entering an anti-peeping display mode, controlling the display device to enter the anti-peeping display mode, wherein after the display device enters the anti-peeping display mode, among the display areas disposed between a central axis of the display device and the first edge, brightness of a display area closer to the first edge is lower than brightness of a display area closer to the central axis, and among the display areas disposed between the central axis and the second edge, brightness of
(Continued)

a display area closer to the second edge is lower than brightness of a display area closer to the central axis, where the central axis is parallel to the first edge.

8 Claims, 7 Drawing Sheets

(51) Int. Cl.
    *G09G 5/10* (2006.01)
    *F21V 8/00* (2006.01)

(52) U.S. Cl.
    CPC ......... *G09G 5/10* (2013.01); *G09G 2320/028* (2013.01); *G09G 2320/068* (2013.01); *G09G 2320/0686* (2013.01)

(58) Field of Classification Search
    CPC ........... G09G 2320/0686; G09G 3/342; G09G 2358/00; G02B 6/0068; G02B 6/0073; G02B 6/0011
    See application file for complete search history.

(56) References Cited

U.S. PATENT DOCUMENTS

| | | |
|---|---|---|
| 2018/0075813 A1 | 3/2018 | Zhang et al. |
| 2019/0041697 A1* | 2/2019 | Yan ................. G02F 1/1336 |
| 2019/0353838 A1* | 11/2019 | Heber ................. G02B 6/0036 |
| 2020/0249505 A1 | 8/2020 | Fang et al. |
| 2020/0249530 A1* | 8/2020 | He ................. G02F 1/133609 |
| 2021/0020115 A1* | 1/2021 | Lee ................. G02F 1/133 |
| 2021/0048722 A1* | 2/2021 | Peana ................. G02F 1/29 |
| 2021/0063822 A1* | 3/2021 | Wang ................. H01L 25/167 |
| 2021/0072451 A1* | 3/2021 | Robinson ............. G02B 6/0055 |
| 2021/0233970 A1* | 7/2021 | Wang ................. H01L 27/3213 |
| 2021/0325731 A1 | 10/2021 | Li et al. |
| 2021/0341768 A1* | 11/2021 | Woodgate ........... G02F 1/13471 |

FOREIGN PATENT DOCUMENTS

| | | |
|---|---|---|
| CN | 106802499 A | 6/2017 |
| CN | 107561772 A | 1/2018 |
| CN | 207965423 U | 10/2018 |
| CN | 108828837 A | 11/2018 |
| CN | 208126055 U | 11/2018 |
| CN | 109239996 A | 1/2019 |
| CN | 110415652 A | 11/2019 |
| CN | 210323664 U | 4/2020 |
| CN | 111183475 A | 5/2020 |
| CN | 111474747 A | 7/2020 |
| CN | 111681613 A | 9/2020 |
| JP | 2007011316 A | 1/2007 |

* cited by examiner

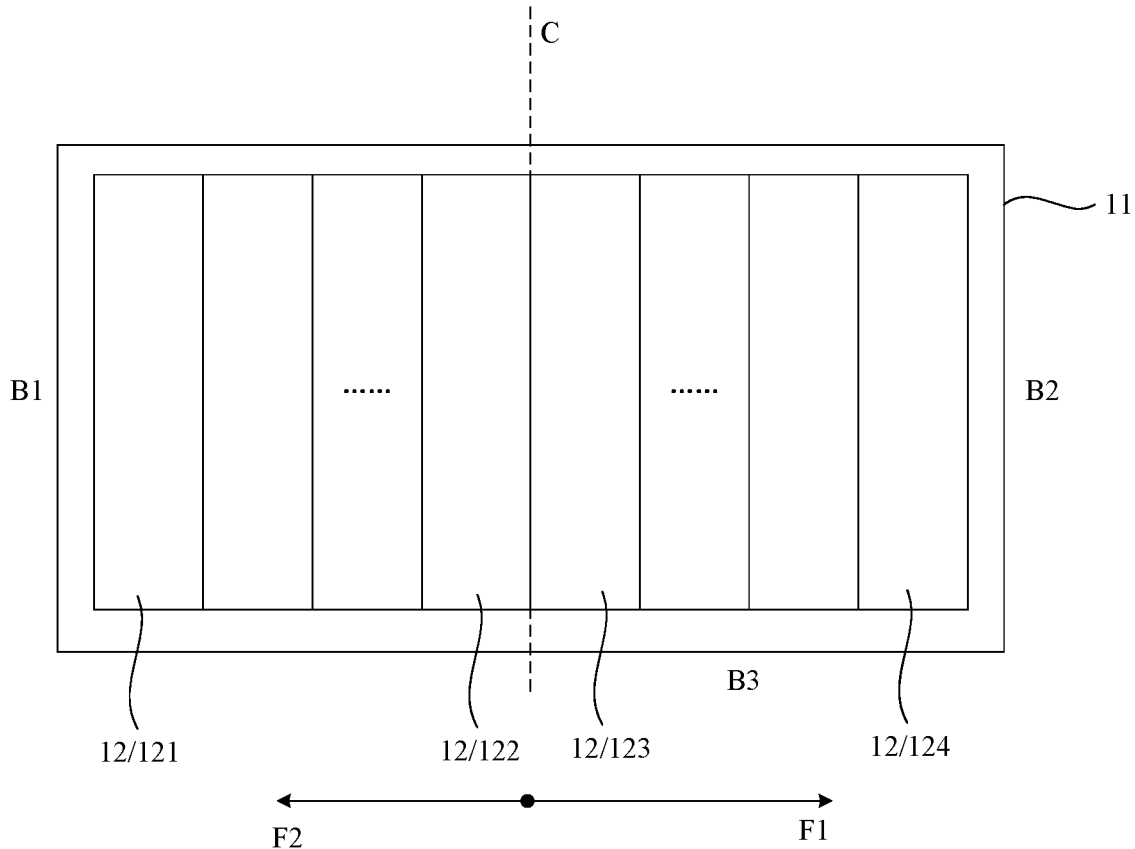

In response to a first control instruction for entering an anti-peeping display mode, controlling the display device to enter the anti-peeping display mode, wherein after the display device enters the anti-peeping display mode, among the display areas disposed between a central axis of the display device and the first edge, brightness of a display area closer to the first edge is lower than brightness of a display area closer to the central axis, and among the display areas disposed between the central axis and the second edge, brightness of a display area closer to the second edge is lower than brightness of a display area closer to the central axis, where the central axis is parallel to the first edge

FIG. 2

BACKLIGHT MODULE, DISPLAY DEVICE AND CONTROL METHOD THEREOF

CROSS-REFERENCES TO RELATED APPLICATIONS

This patent application claims the priority of a Chinese patent application No. 2020110195336, filed on Sep. 24, 2020, and entitle "BACKLIGHT MODULE, DISPLAY DEVICE AND CONTROL METHOD THEREOF", the entire content of which is hereby incorporated by reference for all purposes.

TECHNICAL FIELD

This application relates to the field of display technology, and in particular to a backlight module, a display device and a control method thereof.

BACKGROUND

In the related art, in order to realize an anti-peeping function of a display device, a dedicated anti-peeping element has to be provided on the display device. The anti-peeping element is, for example, a dimming film between a display panel and a collimated backlight, an anti-peeping film between the display panel and the backlight module, or an optical structure between the display panels, and so on. However, such configuration can increase the thickness and weight of the display device, which is not desirable to the thinning of the display device.

SUMMARY

The present disclosure provides a backlight module, a display device and a control method thereof to solve the deficiencies in the related art.

According to a first aspect of the embodiments of the present disclosure, there is provided a control method for a display device, wherein the display device includes a first edge, a second edge, and a number N of display areas, where N is an integer larger than or equal to 3, and the N display areas are disposed between the first edge B1 and the second edge and arranged along a first direction; an extending direction of the first edge and an extending direction of the second edge respectively intersect with the first direction, and the first edge and the second edge are arranged along the first direction; the method includes:

in response to a first control instruction for entering an anti-peeping display mode, controlling the display device to enter the anti-peeping display mode, wherein after the display device enters the anti-peeping display mode, among the display areas disposed between a central axis of the display device and the first edge, brightness of a display area closer to the first edge is lower than brightness of a display area closer to the central axis, and among the display areas disposed between the central axis and the second edge, brightness of a display area closer to the second edge is lower than brightness of a display area closer to the central axis, where the central axis is parallel to the first edge.

In an example, after the display device enters the anti-peeping display mode, the brightness of the display areas disposed between the central axis and the first edge decreases sequentially along a second direction, and the brightness of the display areas disposed between the central axis and the second edge decreases sequentially along the first direction, where the first direction is a direction from the first edge to the second edge, and the second direction is the opposite direction of the first direction.

In an example, in response to a second control instruction for entering a normal display mode, the display device is controlled to enter the normal display mode, and after the display area enters the normal display mode, among the display areas disposed between the central axis and the first edge of the display device, the brightness of the display area closer to the first edge is higher than the brightness of the display area closer to the central axis; and among the display areas disposed between the central axis and the second edge, the brightness of the display area closer to the second edge is higher than the brightness of the display area closer to the central axis.

In an example, after the display device enters the normal display mode, the brightness of the display areas disposed between the central axis and the first edge increases sequentially along a second direction, and the brightness of the display areas disposed between the central axis and the second edge increases sequentially along the first direction, where the first direction is a direction from the first edge to the second edge, and the second direction is the opposite direction of the first direction.

In an example, the display device includes a backlight module, the backlight module includes N backlight subareas, and the N backlight subareas provide backlights for the N display areas in a one-to-one correspondence, the N backlight subareas are disposed between the first edge and the second edge, and arranged along the first direction;

after the display device enters the anti-peeping display mode, among the backlight subareas between the central axis and the first edge, brightness of a backlight subarea closer to the first edge is lower than brightness of a backlight subarea closer to the central axis, and among the backlight subareas disposed between the central axis and the second edge, brightness of a backlight subarea closer to the second edge is lower than brightness of a backlight subarea closer to the central axis;

after the display device enters the normal display mode, among the backlight subareas disposed between the central axis and the first edge, brightness of a backlight subarea closer to the first edge is higher than brightness of a backlight subarea closer to the central axis, and among the backlight subareas disposed between the central axis and the second edge, brightness of a backlight subarea closer to a second edge is higher than brightness of a backlight subarea closer to the central axis.

In an example, the backlight module is an edge-type backlight module, the display device includes a third edge, and the third edge extends along the first edge, the edge-type backlight module includes a light bar, the light bar is disposed on one side of the third edge of the display device and extends along the first direction, the light bar includes a plurality of LED lamp beads, the plurality of LED lamp beads are divided into N lamp groups, and the N lamp groups provide backlight for the N backlight subareas in a one-to-one correspondence; all the LED lamp beads in the same lamp group are connected in series, driving currents for all the LED lamp beads in the same lamp group are the same; and the N lamp groups are connected in parallel.

In an example, the backlight module is a direct-type backlight module, and the direct-type backlight module includes a plurality of LED lamp beads arranged in an array along the first direction and a third direction, where the third direction intersects with the first direction; the plurality of LED lamp beads are divided into N lamp groups, and the N lamp groups provide backlights for the N backlight subareas in a one-to-one correspondence; the N lamp groups are arranged along the first direction; driving currents for all the LED lamp beads in the lamp group are the same.

In an example, after the display device enters the anti-peeping display mode, the driving currents of the LED lamp beads in the N lamp groups satisfies following first curve equation:

$$I = -\frac{21.6}{(N-1)^2}x^2 + \frac{21.6(N+1)}{(N-1)^2}x + 3.6 - \frac{21.6N}{(N-1)^2}$$

after the display device enters the normal display mode, the driving currents of the LED lamp beads in the N lamp groups satisfies following second curve equation:

$$I = \frac{22.48}{(N-1)^2}x^2 - \frac{22.48(N+1)}{(N-1)^2}x + 14.62 + \frac{22.48N}{(N-1)^2}$$

where I is a current, x is a sequence number the lamp group in the first direction, and x is 1, 2, 3, . . . , N;

N is an even number, and two lamp groups with sequence numbers N/2 and N/2+1 in the first direction are respectively disposed on two sides of the central axis;

after the display device enters the anti-peeping display mode, the driving currents of the LED lamp beads in the two lamp groups with the sequence numbers N/2 and N/2+1 in the first direction are the same, and both are a first driving current, the driving currents of the LED lamp beads in the two lamp groups with sequence numbers 1 and N in the first direction are the same, and both are a second driving current; the second driving current is smaller than the first driving current;

after the display device enters the normal display mode, the driving currents of the LED lamp beads in the two lamp groups with the sequence numbers N/2 and N/2+1 in the first direction are the same, and both are the first driving current, the driving currents of the LED lamp beads in the two lamp groups with the sequence numbers 1 and N in the first direction are the same, and both are a third driving current; the third driving current is larger than the first driving current.

In an example, before the response to the first control instruction for entering the anti-peeping display mode, the method further includes:

in response to a first switching operation of switching the normal display mode to the anti-peeping display mode, generating the first control instruction;

controlling the display device to enter the anti-peeping display mode includes:

controlling the display device to enter a first transitional display mode from the normal display mode; wherein, after the display device enters the first transitional display mode, for the same lamp group, the driving current of the LED lamp beads in the lamp group is smaller than the driving current when the display device is in the normal display mode, and larger than the driving current when the display device is in the anti-peeping display mode; and controlling the display device to enter the anti-peeping display mode from the first transition display mode.

In an example, before the response to the second control instruction for entering the normal display mode, the method further includes:

in response to a second switching operation of switching the anti-peeping display mode to the normal display mode, generating the second control instruction;

controlling the display device to enter the normal display mode includes:

controlling the display device to enter a second transitional display mode from the anti-peeping display mode; wherein, after the display device enters the second transitional display mode, for the same lamp group, the driving current of the LED lamp beads in the lamp group is larger than the driving current when the display device is in the anti-peeping display mode, and smaller than the driving current when the display device is in the normal display mode;

controlling the display device to enter the normal display mode from the second transition display mode.

In an example, the display device further includes a display panel and an anti-peeping film, the anti-peeping film is disposed between the backlight module and the display panel;

after the display device enters the anti-peeping display mode, a ratio of brightness of a 45° viewing angle to brightness of a 0° viewing angle of the display device is lower than or equal to 0.75%.

According to a second aspect of the embodiments of the present disclosure, there is provided a display device, including a first edge, a second edge, a number N of display areas, and a processing chip, where N is an integer larger than or equal to 3, wherein the N display areas are disposed between the first edge and the second edge and arranged along a first direction; an extending direction of the first edge and an extending direction of the second edge intersect with the first direction respectively, and the first edge and the second edge are arranged along the first direction;

the processing chip is configured to control the display device to enter an anti-peeping display mode in response to a first control instruction for entering the anti-peeping display mode, wherein after the display device enters the anti-peeping display mode, among the display areas disposed between a central axis of the display device and the first edge, brightness of a display area closer to the first edge is lower than brightness of a display area closer to the central axis C, and among the display areas disposed between the central axis and the second edge, brightness of a display area closer to the second edge is lower than brightness of a display area closer to the central axis, where the central axis C is parallel to the first edge.

According to a third aspect of the embodiments of the present disclosure, there is provided a backlight module, applied to the display device described above, wherein the backlight module includes a number N of backlight subareas, and the N backlight subareas provide backlights for the N display areas in a one-to-one correspondence, and the N backlight subareas are disposed between the first edge and the second edge, and are arranged along the first direction;

after the display device enters the anti-peeping display mode, among the backlight subareas disposed between the central axis and the first edge, brightness of a backlight subarea closer to the first edge is lower than brightness of a backlight subarea closer to the central axis, and among the backlight subareas disposed between the central axis and the second edge, brightness of a backlight subarea closer to the second edge is lower than brightness of a backlight subarea closer to the central axis.

According to the above embodiments, the display device includes a first edge, a second edge, and N display areas, the N display areas are disposed between the first edge and the second edge, and arranged along the first direction, where the extending direction of the first edge and the extending direction of the second edge intersect with the first direction respectively, and the first edge and the second edge are arranged along the first direction, and the display device enters the anti-peeping display mode in response to a first control instruction for entering the anti-peeping display mode. After the display device enters the anti-peeping display mode, among the display areas disposed between a central axis of the display device and the first edge, brightness of a display area closer to the first edge is lower than brightness of a display area closer to the central axis, and among the display areas disposed between the central axis and the second edge, brightness of a display area closer to the second edge is lower than brightness of a display area closer to the central axis, where the central axis is parallel to the first edge. In other words, the brightness of the display area closer to the edge of the display device is lower than the brightness of the display area closer to the center of the display device. Thereby, the purpose of anti-peeping can be achieved, the display content can be prevented from leaking, and the security of the display content can be improved. Moreover, without additional hardware, the thickness and weight of the display device can be prevented from increasing, which is beneficial to the thinning of the display device.

It is to be understood that the above general descriptions and the below detailed descriptions are merely exemplary and explanatory, and are not intended to limit the present disclosure.

BRIEF DESCRIPTION OF THE DRAWINGS

The accompanying drawings, which are incorporated in and constitute a part of this specification, illustrate examples consistent with the present disclosure and, together with the description, serve to explain the principles of the disclosure.

FIG. 1 is a schematic structural diagram of a display device according to an embodiment of the present disclosure;

FIG. 2 is a flowchart of a control method for a display device according to an embodiment of the present disclosure;

DETAILED DESCRIPTION OF THE EMBODIMENTS

Figure 3:
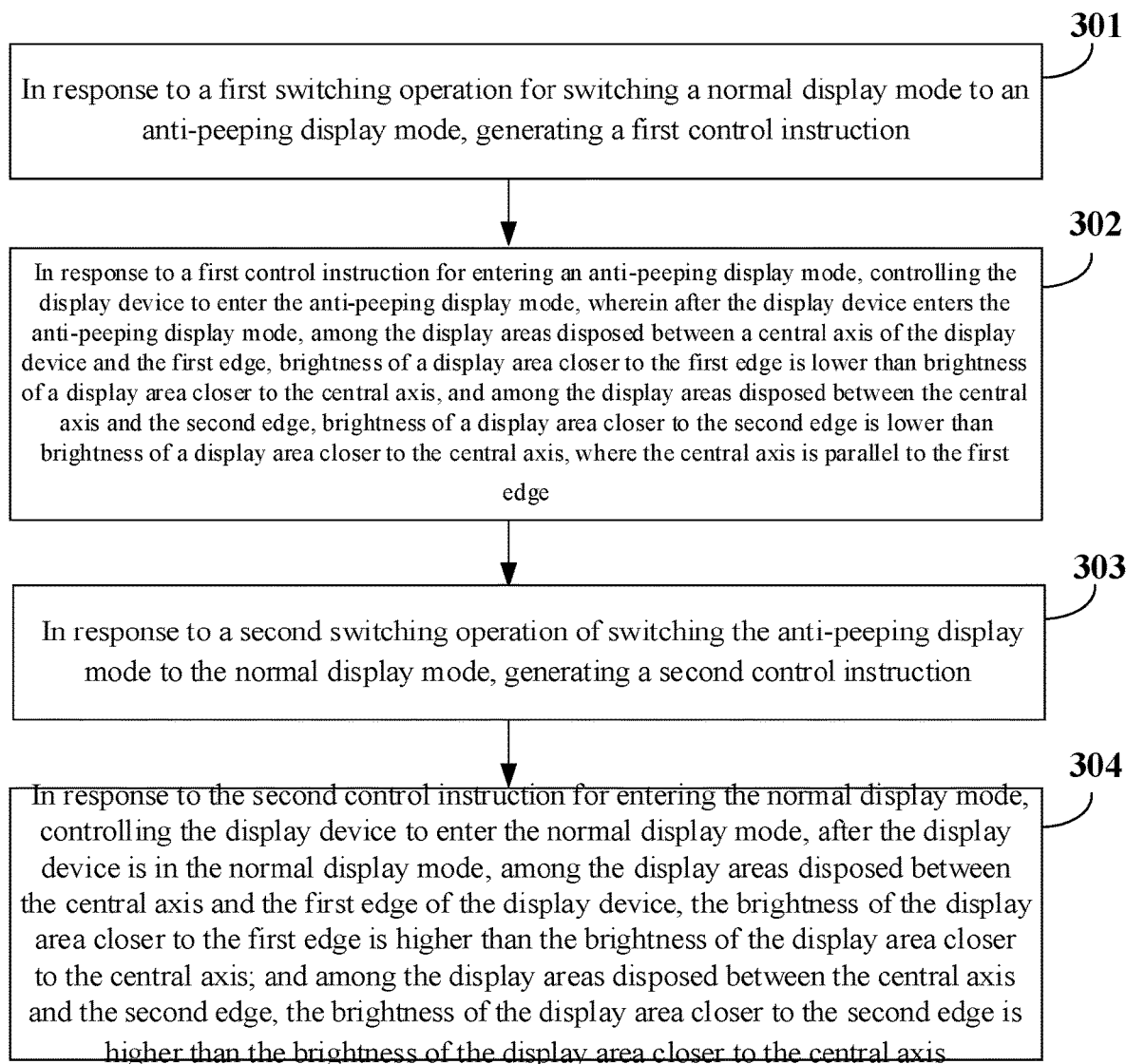
FIG. 3 is a flowchart of another control method for a display device according to an embodiment of the present disclosure.

Examples will be described in detail herein, with the illustrations thereof represented in the drawings. When the following descriptions involve the drawings, like numerals in different drawings refer to like or similar elements unless otherwise indicated. The embodiments described in the following examples do not represent all embodiments consistent with the present disclosure. Rather, they are merely examples of apparatuses and methods consistent with some aspects of the present disclosure as detailed in the appended claims.

The embodiment of the present disclosure provides a control method for a display device. The display device 11 includes a first edge B1, a second edge B2, and a number N of display areas 12, where N is an integer larger than or equal to 3. The N display areas 12 are disposed between the first edge B1 and the second edge B2 and arranged along a first direction F1. The extending direction of the first edge B1 and the extending direction of the second edge B2 respectively intersect with the first direction F1, and the first edge B1 and the second edge B2 are arranged along the first direction F1. The control method for the display device, as shown in FIG. 2, includes the following steps 201.

In step 201, in response to a first control instruction for entering an anti-peeping display mode, the display device 11 is controlled to enter the anti-peeping display mode. After the display device 11 enters the anti-peeping display mode, among the display areas 12 disposed between a central axis C of the display device 11 and the first edge B1, brightness of a display area 12 closer to the first edge B1 is lower than brightness of a display area 12 closer to the central axis C, and among the display areas 12 disposed between the central axis C and the second edge B2, brightness of a display area 12 closer to the second edge B2 is lower than brightness of a display area 12 closer to the central axis C, where the central axis C is parallel to the first edge B1.

In this example, the display device 11 includes a first edge B1, a second edge B2, and N display areas 12, the N display areas 12 are disposed between the first edge B1 and the second edge B2, and arranged along the first direction F1, where the extending direction of the first edge B1 and the extending direction of the second edge B2 intersect with the first direction F1 respectively, and the first edge B1 and the second edge B2 are arranged along the first direction F1, and the display device 11 enters the anti-peeping display mode in response to a first control instruction for entering the anti-peeping display mode. After the display device 11 enters the anti-peeping display mode, among the display areas 12 disposed between a central axis C of the display device 11 and the first edge B1, brightness of a display area 12 closer to the first edge B1 is lower than brightness of a display area 12 closer to the central axis C, and among the display areas 12 disposed between the central axis C and the second edge B2, brightness of a display area 12 closer to the second edge B2 is lower than brightness of a display area 12 closer to the central axis C, where the central axis C is parallel to the first edge B1. In other words, the brightness of the display area 12 closer to the edge of the display device 11 is lower than the brightness of the display area 12 closer to the center of the display device 11. Thereby, the purpose of anti-peeping can be achieved, the display content can be prevented from leaking, and the security of the display content can be improved. Moreover, without additional hardware, the thickness and weight of the display device can be prevented from increasing, which is beneficial to the thinning of the display device.

The control method for the display device provided by the embodiment of the present disclosure has been briefly introduced above, and the control method for the display device provided by the embodiment of the present disclosure will be described in detail below.

The embodiment of the present disclosure also provides a control method for the display device. The display device 11, as shown in FIG. 1, includes: a first edge B1, a second edge B2, a third edge B3, and a number N of display areas 12, where N is an integer larger than or equal to 3.

In this example, the extending direction of the first edge B1 and the extending direction of the second edge B2 are respectively perpendicular to the first direction F1, and the first edge B1 and the second edge B2 are arranged along the first direction F1. The third edge B3 extends along the first direction F1. The first direction F1 is a direction from the first edge B1 to the second edge B2.

In this example, the N display areas 12 are disposed between the first edge B1 and the second edge B2, and are arranged along the first direction F1.

In this example, N is an even number. Two display areas 122 and 123 with sequence numbers N/2 and N/2+1 in the first direction F1 are respectively disposed on two sides of the central axis C and adjacent to the central axis C. The central axis C is perpendicular to the first direction F1 and parallel to the first edge B1. A display area 121 with a sequence number 1 in the first direction F1 is adjacent to the first edge B1, and a display area 124 with a sequence number N in the first direction F1 is adjacent to the second edge B2.

In this example, N is 16. The display area 122 with a sequence number 8 and the display area 123 with a sequence number 9 in the first direction F1 are respectively disposed on both sides of the central axis C and adjacent to the central axis C. The display area 121 with a sequence number 1 in the first direction F1 is adjacent to the first edge B1, and the display area 124 with a sequence number 16 in the first direction F1 is adjacent to the second edge B2. However, N can also be other even numbers larger than or equal to 3, for example, N is 18, 20, and so on. N can also be an odd number, for example, N is 17, 19, and so on.

In this example, as shown in FIG. 3, the control method for the display device includes the following steps 301 to 304.

In step 301, in response to a first switching operation for switching a normal display mode to an anti-peeping display mode, a first control instruction is generated.

In one example, when the display device is in the normal display mode, among the display areas 12 disposed between the central axis C and the first edge B1 of the display device 11, the brightness of the display area 12 closer to the first edge B1 is higher than the brightness of the display area 12 closer to the central axis C; and among the display areas 12 disposed between the central axis C and the second edge B2, the brightness of the display area 12 closer to the second edge B2 is higher than the brightness of the display area 12 closer to the central axis C. For example, the brightness of the display area 121 is higher than the brightness of the display area 122, and the brightness of the display area 124 is higher than the brightness of the display area 123. When the display device 11 is in the normal display mode, the brightness for a large viewing angle of the display device 11 is sufficient to enable the display content to be seen clearly when the display content of the display device 11 is viewed from the large viewing angle. In addition, the aforementioned normal display mode can also be referred to as a shared display mode.

In one example, when the display device 11 is in the anti-peeping display mode, among the display areas 12 disposed between the central axis C and the first edge B1 of the display device 11, the brightness of the display area 12 closer to the first edge B1 is lower than the brightness of the display area 12 closer to the central axis C; and among the display areas 12 disposed between the central axis C and the second edge B2, the brightness of the display area 12 closer to the second edge B2 is lower than the brightness of the display area 12 closer to the central axis C. For example, the brightness of the display area 122 is higher than the brightness of the display area 121, and the brightness of the display area 123 is higher than the brightness of the display area 124. The brightness of the display area 122 and the brightness of the display area 123 can be the same. When the display device 11 is in the anti-peeping display mode, the brightness of the large viewing angle of the display device 11 is not enough to enable the display content to be seen clearly when the display content of the display device 11 is viewed from a large viewing angle. Therefore, the purpose of anti-peeping protection can be achieved, the display content can be prevented from leaking, and the security of the display content can be improved.

In this example, the display device 11 provides a display mode switching button, and the display mode switching button is used to switch the normal display mode to the anti-peeping display mode and switch the anti-peeping display mode to the normal display mode. The display mode switching button can be a virtual button disposed on a display interface, or can be a physical button on the display device 11, for example, a hardware button.

In this example, after the display mode switching button receives the first switching operation to switch the normal display mode to the anti-peeping display mode, the display device 11 generates the first control instruction in response to the first switching operation.

In step 302, in response to the first control instruction for entering the anti-peeping display mode, the display device 11 is controlled to enter the anti-peeping display mode. Wherein, after the display device 11 enters the anti-peeping display mode, among the display areas 12 disposed between the central axis C and the first edge B1 of the display device 11, the brightness of the display area 12 closer to the first edge B1 is lower than the brightness of the display area 12 closer to the central axis C; and among the display areas 12 disposed between the central axis C and the second edge B2, the brightness of the display area 12 closer to the second edge B2 is lower than the brightness of the display area 12 closer to the central axis C, where the central axis C is parallel to the first edge B1.

Figure 4:
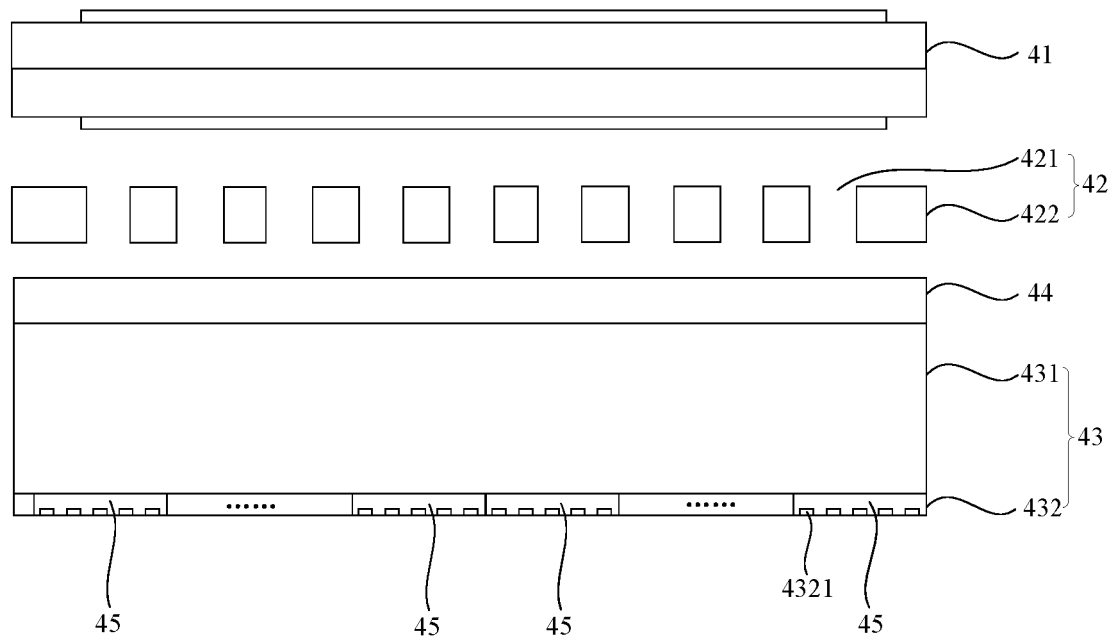
FIG. 4 is a schematic structural diagram of another display device according to an embodiment of the present disclosure.

In this example, as shown in FIG. 4, the display device 11 includes a display panel 41, an anti-peeping film 42, a backlight module 43, and an antireflection film 44. The anti-peeping film 42 is disposed between the liquid crystal display panel 41 and the backlight module 43. The antireflection film 44 is disposed between the anti-peeping film 42 and the backlight module 43. The display panel 41 can be a liquid crystal display panel.

As shown in FIG. 4, the anti-peeping film 42 is used to collimate the backlight provided by the backlight module 43 to achieve the purpose of anti-peeping protection. The anti-peeping film 42 includes a light-transmitting portion 421 and a light-shielding portion 422 alternately arranged. The light-transmitting portion 421 allows the backlight provided by the backlight module 43 to pass through, and achieves collimated emission of the backlight. The anti-reflection film 44 is used to reduce light attenuation and increase the intensity of the backlight passing through the anti-peeping film 42. For example, the antireflection film 44 can include a prism and a diffusion sheet, but is not limited thereto.

In this example, the backlight module 43 includes a number N of backlight subareas. The N backlight subareas provide backlights for the N display areas 12 in a one-to-one correspondence. The N backlight subareas are disposed between the first edge B1 and the second edge B2, and arranged along the first direction F1.

In this example, when the display device 11 is in the normal display mode, among the backlight subareas between the central axis C and the first edge B1, the brightness of the backlight subarea closer to the first edge B1 is higher than the brightness of the backlight subarea closer to the central axis C, so that among the display areas 12 between the central axis C and the first edge B1 of the display device 11, the brightness of the display area 12 closer to the first edge B1 is higher than the brightness of the display area 12 closer to the central axis C. Among the backlight subareas disposed between the central axis C and the second edge B2, the brightness of the backlight subarea closer to the second edge B2 is higher than the brightness of the backlight subarea closer to the central axis C, so that among the display areas 12 disposed between the central axis C and the second edge B2, the brightness of the display area 12 closer to the second edge B2 is higher than the brightness of the display area 12 closer to the central axis C.

In this example, after the display device 11 enters the anti-peeping display mode, among the backlight subareas between the central axis C and the first edge B1, the brightness of the backlight subarea closer to the first edge B1 is lower than the brightness of the backlight subarea closer to the central axis C, so that among the display areas 12 between the central axis C and the first edge B1 of the display device 11, the brightness of the display area 12 closer to the first edge B1 is lower than the brightness of the display area 12 closer to the central axis C. Among the backlight subareas disposed between the central axis C and the second edge B2, the brightness of the backlight subarea closer to the second edge B2 is lower than the brightness of the backlight subarea closer to the central axis C, so that among the display areas 12 disposed between the central axis C and the second edge B2, the brightness of the display area 12 closer to the second edge B2 is lower than the brightness of the display area 12 closer to the central axis C.

In this example, the backlight module 43 is an edge-type backlight module. As shown in FIG. 4, the edge-lit backlight module includes a light guide plate 431 and a light bar 432. The light bar 432 is disposed on one side of the third edge B3 of the display device 11 and extends along the first direction F1.

Figure 5:
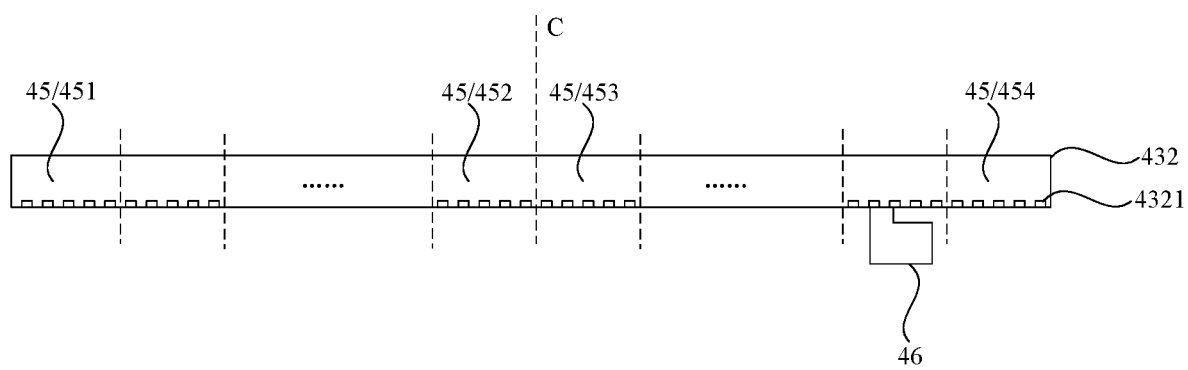
FIG. 5 is a schematic structural diagram of another display device according to an embodiment of the present disclosure.

As shown in FIGS. 4 and 5, the light bar 432 includes a plurality of LED lamp beads 4321, and the plurality of LED lamp beads are divided into a number N of lamp groups 45, and the N lamp groups 45 provide backlights for the N backlight subareas in a one-to-one correspondence. As shown in FIG. 5, the display device 11 further includes a circuit chip 46, and the circuit chip 46 is used to control the driving current of the LED lamp beads 4321.

Figure 6:
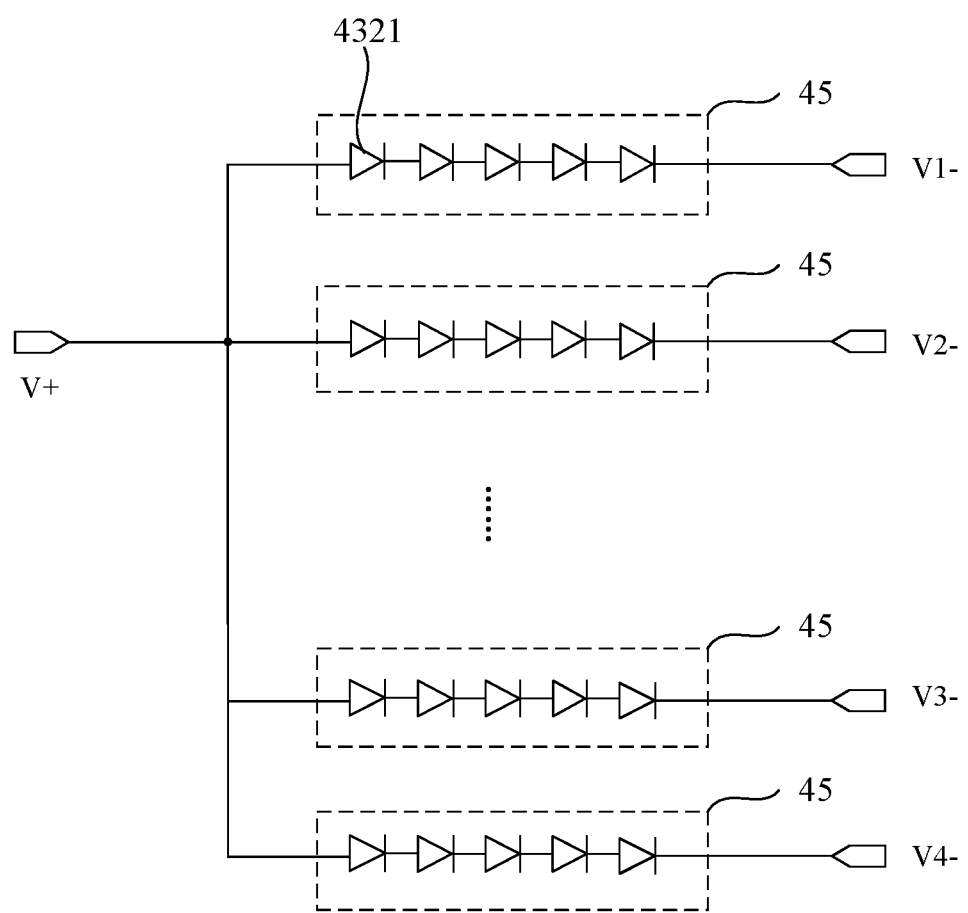
FIG. 6 is a schematic structural diagram of another display device according to an embodiment of the present disclosure.

In one example, as shown in FIG. 6, the same lamp group 45 includes 5 LED lamp beads 4321, all the LED lamp beads 4321 in the same lamp group 45 are connected in series, and all the LED lamp beads 4321 in the same lamp group 45 have the same driving current. The N lamp groups 45 are connected in parallel. First ends of all the lamp groups 45 are connected to a positive voltage input terminal V+, and second ends of the different lamp groups 45 are connected to corresponding negative voltage input terminals. For example, a second end of a lamp group 45 is connected to a corresponding first negative voltage input terminal V1−, a second end of another lamp group 45 is connected to a corresponding second negative voltage input terminal V2−, a second terminal of yet another lamp group 45 is connected to a corresponding third negative voltage input terminal V3−, and a second end of still another lamp group 45 is connected to a corresponding fourth negative voltage input terminal V4−. By controlling the voltage input from the negative voltage input terminal, the driving current of all the LED lamp beads 4321 in the lamp group 45 can be controlled, thereby controlling the brightness of the corresponding backlight subarea.

In one example, the LED lamp beads 4321 are dual crystal LED lamp beads. In this way, a ratio of A/P can be increased, where A is a distance between the LED lamp beads 4321 and the display panel 41, and P is a distance between adjacent LED lamp beads 4321. This can avoid the phenomenon of hot spots.

In this example, when the display device 11 is in the normal display mode, the brightness of the display areas 12 disposed between the central axis C and the first edge B1 increases sequentially along the second direction F2, and the brightness of the display areas 12 disposed between the central axis C and the second edge B2 increases sequentially along the first direction F1, where the second direction F2 is the opposite direction of the first direction F1.

In this example, when the display device 11 is in the normal display mode, among the lamp groups 45 disposed between the central axis C and the first edge B1, the driving current of the LED lamp beads 4321 in the lamp group 45 closer to the first edge B1 is larger than the driving current of the LED lamp beads 4321 in the lamp group 45 closer to the central axis C, so that among the display areas 12 disposed between the central axis C and the first edge B1 of the display device 11, the brightness of the display area 12 closer to the first edge B1 is higher than the brightness of the display area 12 closer to the central axis C. Among the lamp groups 45 disposed between the central axis C and the second edge B2, the driving current of the LED lamp beads 4321 in the lamp group 45 closer to the second edge B2 is larger than the driving current of the LED lamp beads 4321 in the lamp group 45 closer to the central axis C, so that among the display areas 12 disposed between the central axis C and the second edge B2, the brightness of the display area 12 closer to the second edge B2 is higher than the brightness of the display area 12 closer to the central axis C.

In this example, when the display device is in the normal display mode, the driving current of the LED lamp beads 4321 in the N lamp groups 45 satisfies the following second curve equation, so that the comfort degree for the user's eyes can be further improved when the user is watching the displayed content.

$$I = \frac{22.48}{(N-1)^2}x^2 - \frac{22.48(N+1)}{(N-1)^2}x + 14.62 + \frac{22.48N}{(N-1)^2}$$

where, I is the current, x is the sequence number of the lamp group 45 in the first direction F1, and x is 1, 2, 3, ..., N.

In this example, N is 16. The above-mentioned second curve equation is $I=0.1x^2-1.7x+16.22.$ In this example, as shown in FIG. 5, the lamp group 452 with a sequence number 8 and the lamp group 453 with a sequence number 9 in the first direction F1 are respectively disposed on two sides of the central axis C, and are adjacent to the central axis C.

Figure 7:
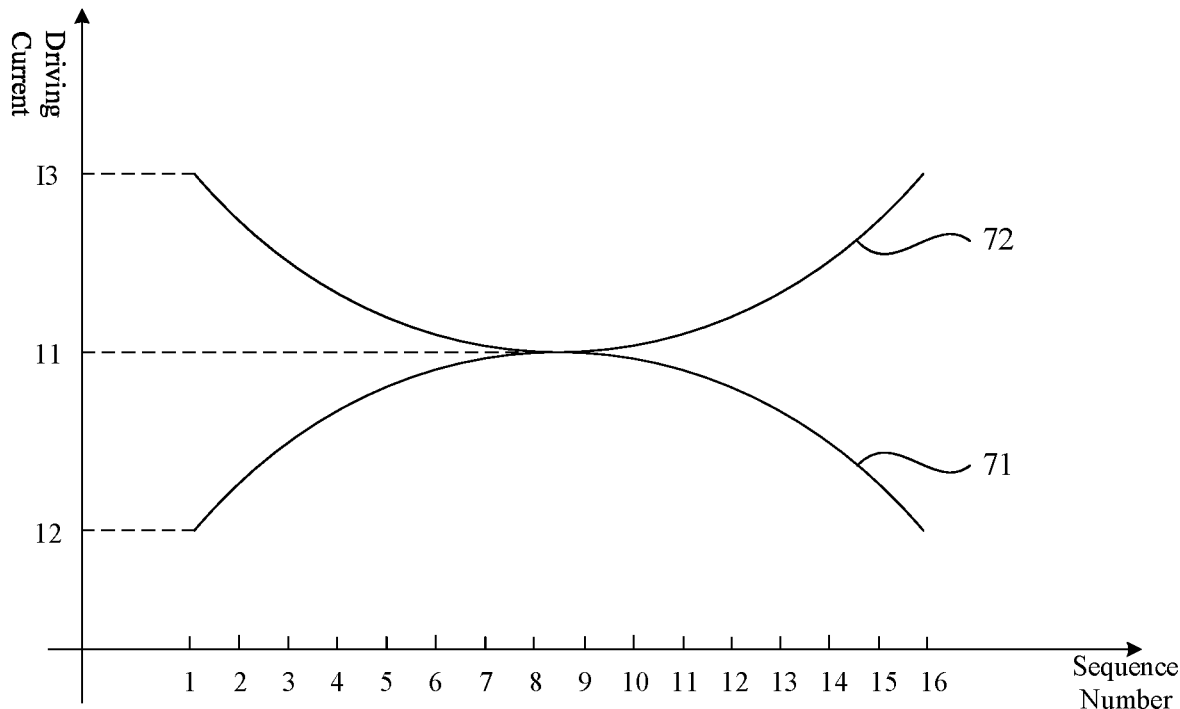
FIG. 7 is a schematic diagram showing a driving current of an LED lamp bead according to an embodiment of the present disclosure.

In this example, as shown in FIG. 7, when the display device is in the normal display mode, the driving current of the LED lamp beads 4321 in the N lamp groups 45 is shown by the second curve 72, and the equation for the second curve 72 is the second curve equation above. The driving current of the LED lamp beads 4321 in the lamp group 452 with a sequence number 8 is the same as the driving current of the LED lamp beads 4321 in the lamp group 453 with a sequence number 9 in the first direction F1, and both are a first driving current I1. In the first direction F1, the driving current of the LED lamp beads 4321 in the lamp group 451 with a sequence number 1 is the same as the driving current of the LED lamp beads 4321 in the lamp group 454 with a sequence number 16, and both are a third driving current I3, where the third driving current I3 is higher than the first driving current I1.

In this example, when the display device 11 is in the normal display mode, the first driving current I1 is 9 mA, and the display area 122 with a sequence number 8 and the display area 123 with a sequence number 9 in the first direction F1 both have a brightness 500 nits; the third driving current I3 is 14.62 mA, and the display area 121 with a sequence number 1 and the display area 124 with a sequence number 16 in the first direction F1 both have a brightness 800 nits. However, the first driving current I1 can also be 10 mA, 11 mA or other current values. The third driving current I3 can also be higher than 14.62 mA and lower than or equal to 25 mA, for example, 15 mA, 20 mA, or 25 mA.

In this example, when the display device 11 is in the normal display mode, the driving currents of the LED lamp beads 4321 in the lamp groups with the sequence numbers 7, 8, 9, 10 in the first direction F1 are the same, and they are all the first driving current I1.

In this example, after the display device 11 enters the anti-peeping display mode, the brightness of the display areas 12 disposed between the central axis C and the first edge B1 decreases sequentially along the second direction F2, and the brightness of the display areas 12 disposed between the central axis C and the second edge B2 decreases sequentially along the first direction F1, where the second direction F2 is the opposite direction of the first direction F1. In this way, the comfort degree for the user's eyes can be further improved when the user is watching the displayed content.

It should be noted that after the display device 11 enters the anti-peeping display mode, the brightness of the display areas 12 disposed between the central axis C and the first edge B1 may not decrease sequentially along the second direction F2, for example. The brightness of the display area 12 adjacent to the axis C is a first brightness, the brightness of the display area 12 adjacent to the first edge B1 is a second brightness, and the brightness of the remaining display areas 12 are the same, all of which are a third brightness, where the first brightness is higher than the third brightness, and the third brightness is higher than the second brightness. Similarly, the brightness of the display areas 12 disposed between the central axis C and the second edge B2 may not decrease sequentially along the second direction F2, which will not be repeated here. However, the brightness distribution pattern of the display areas 12 between the central axis C and the first edge B1 and the brightness distribution pattern of the display areas 12 between the central axis C and the second edge B2 are not limited to the above two cases.

In this example, after the display device 11 enters the anti-peeping display mode, among the lamp groups 45 disposed between the central axis C and the first edge B1, the driving current of the LED lamp beads 4321 in the lamp group 45 closer to the first edge B1 is smaller than the driving current of the LED lamp beads 4321 in the lamp group 45 closer to the central axis C, so that among the display areas 12 disposed between the central axis C and the first edge B1 of the display device 11, the brightness of the display area 12 closer to the first edge B1 is lower than the brightness of the display area 12 closer to the central axis C. Among the lamp groups 45 disposed between the central axis C and the second edge B2, the driving current of the LED lamp beads 4321 in the lamp group 45 closer to the second edge B2 is smaller than the driving current of the LED lamp beads 4321 in the lamp group 45 closer to the central axis C, so that among the display areas 12 disposed between the central axis C and the second edge B2, the brightness of the display area 12 closer to the second edge B2 is lower than the brightness of the display area 12 closer to the central axis C.

In this example, after the display device 11 enters the anti-peeping display mode, the driving current of the LED lamp beads 4321 in the N lamp groups 45 satisfies the following following first curve equation, so that the comfort degree for the user's eyes can be further improved when the user is watching the displayed content.

$$I = -\frac{21.6}{(N-1)^2}x^2 + \frac{21.6(N+1)}{(N-1)^2}x + 3.6 - \frac{21.6N}{(N-1)^2}$$

In this example, N is 16. The above-mentioned first curve equation is $I=-0.096x^2+1.632x+2.064.$ In this example, as shown in FIG. 7, after the display device 11 enters the anti-peeping display mode, the driving current of the LED lamp beads 4321 in the N lamp groups 45 is shown by the first curve 71, and the equation for the first curve 71 is the first curve equation above. The driving current of the LED lamp beads 4321 in the lamp group 452 with a sequence number 8 is the same as the driving current of the LED lamp beads 4321 in the lamp group 453 with a sequence number 9 in the first direction F1, and both are a first driving current I1. In the first direction F1, the driving current of the LED lamp beads 4321 in the lamp group 451 with a sequence number 1 is the same as the driving current of the LED lamp beads 4321 in the lamp group 454 with a sequence number 16, and both are a second driving current I2, where the second driving current I2 is higher than the first driving current In this example, after the display device 11 enters the anti-peeping display mode, the first driving current I1 is 9 mA, and the display area 122 with a sequence number 8 and the display area 123 with a sequence number 9 in the first direction F1 both have a brightness 500 nits; the second driving current I2 is 3.6 mA, and the brightness of the display area 121 with a sequence number 1 and the display area 124 with a sequence number 16 in the first direction F1 both have a brightness 200 nits. However, the first driving current I1 can also be 10 mA, 11 mA or other current values. The second driving current I2 can also be higher than 3.6 mA, for example, 3.7 mA, 3.8 mA, 4 mA or other current values.

In this example, after the display device 11 enters the anti-peeping display mode, the driving currents of the LED lamp beads 4321 in the lamp groups with the sequence numbers 7, 8, 9, 10 in the first direction F1 are the same, and they are all the first driving current I1. That is, the driving current of the LED lamp beads 4321 in the lamp groups with the sequence numbers 7, 8, 9, and 10 in the first direction F1 remains unchanged.

In this example, after the display device 11 enters the anti-peeping display mode, the ratio of the brightness of the 45° viewing angle to the brightness of the 0° viewing angle of the display device is lower than 0.75%. However, the ratio of the brightness of the 45° viewing angle to the brightness of the 0° viewing angle of the display device can also be equal to 0.75%.

In this example, the smaller the size of the light-transmitting portion 421 of the anti-peeping film 42 is, the better the viewing angle narrowing effect of the anti-peeping film 42 and the better the anti-peeping protection effect will be. In this case, to ensure the effect of the normal display mode, the second driving current I2 and the third driving current I3 are larger. On the contrary, the larger the size of the light-transmitting portion 421 of the anti-peeping film 42 is, the worse the viewing angle narrowing effect of the anti-peeping film 42 and the worse the anti-peeping protection effect will be. In this case, to ensure the effect of the anti-peeping display mode, the second driving current I2 and the third driving current I3 are smaller.

In step 303, in response to a second switching operation of switching the anti-peeping display mode to the normal display mode, a second control instruction is generated.

In this example, after the display mode switching button receives the second switching operation for switching the anti-peeping display mode to the normal display mode, the display device 11 generates a second control instruction in response to the second switching operation.

In step 304, in response to the second control instruction for entering the normal display mode, the display device 11 is controlled to enter the normal display mode. After the display device 11 is in the normal display mode, among the display areas 12 disposed between the central axis C and the first edge B1 of the display device 11, the brightness of the display area 12 closer to the first edge B1 is higher than the brightness of the display area 12 closer to the central axis C; and among the display areas 12 disposed between the central axis C and the second edge B2, the brightness of the display area 12 closer to the second edge B2 is higher than the brightness of the display area 12 closer to the central axis C.

In this example, as shown in FIG. 7, when the display device is switched from the anti-peeping display mode to the normal display mode, the driving current for the LED lamp beads 4321 in the lamp groups with the sequence numbers 7, 8, 9, 10 in the first direction F1 remains unchanged, that is, the brightness of the display areas 12 with sequence numbers 7, 8, 9, 10 in the first direction F1 remains unchanged, while the brightness of display areas 12 with sequence numbers 1-6 and 11~16 is increased, so that the display content can be viewed from a large viewing angle, and the display content can be shared.

In this example, the display device 11 includes a first edge B1, a second edge B2, and N display areas 12, the N display areas 12 are disposed between the first edge B1 and the second edge B2, and are arranged along the first direction F1, where the extending direction of the first edge B1 and the extending direction of the second edge B2 intersect with the first direction F1 respectively, and the first edge B1 and the second edge B2 are arranged along the first direction F1. Thus, after the display device 11 enters the anti-peeping display mode in response to the first control instruction for entering the anti-peeping display mode, among the display areas 12 disposed between the central axis C and the first edge B1 of the display device 11, the brightness of the display area 12 closer to the first edge B1 is lower than the brightness of the display area 12 closer to the central axis C; and among the display areas 12 disposed between the central axis C and the second edge B2, the brightness of the display area 12 closer to the second edge B2 is lower than the brightness of the display area 12 closer to the central axis C, where the central axis C is parallel to the first edge B1. That is, the brightness of the display area 12 closer to the edge of the display device 11 is lower than the brightness of the display area 12 closer to the center of the display device 11. Thereby, the purpose of anti-peeping can be achieved, the display content can be prevented from leaking, and the security of the display content can be improved. Moreover, without adding hardware, the thickness and weight of the display device can be prevented from increasing, which is beneficial to the thinning of the display device.

The example of the present disclosure also provides a control method for the display device. The difference from the foregoing example is that in this example, the backlight module 43 is a direct-type backlight module. The direct-type backlight module includes a plurality of LED lamp beads 4321 arranged in an array along a first direction F1 and a third direction, where the third direction is perpendicular to the first direction.

In this example, the plurality of LED lamp beads 4321 are also divided into N lamp groups, and the N lamp groups provide backlights for the N backlight subareas in a one-to-one correspondence. The N lamp groups are arranged along the first direction F1, and all the LED lamp beads 4321 in the same lamp group have the same driving current. The LED lamp beads 4321 are dual crystal LED lamp beads.

The control method for the display device in this example is similar to the control method for the display device in the foregoing example, and will not be repeated here.

Figure 8:
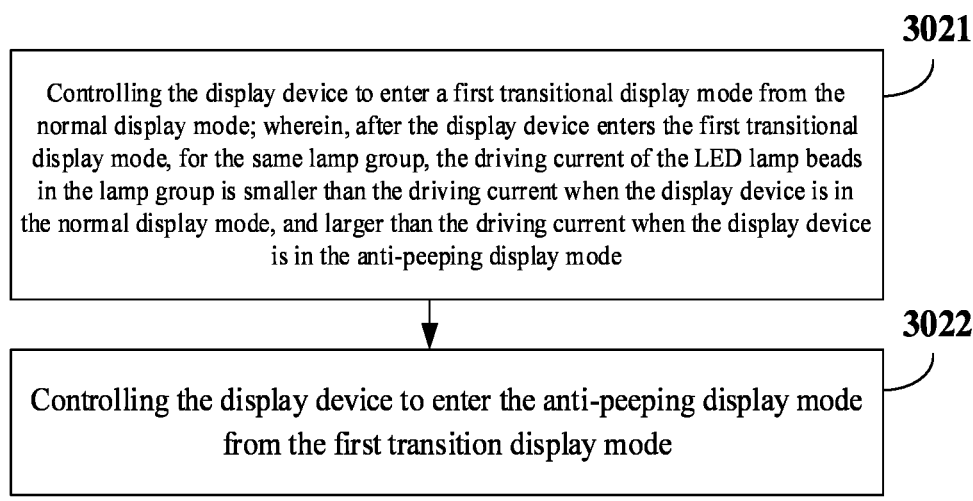
FIG. 8 is a flowchart of another control method for a display device according to an embodiment of the present disclosure.

The example of the present disclosure also provides a control method for the display device. In this example, as shown in FIG. 8, the aforementioned step 302 includes the following steps 3021 to 3022.

In step 3021, the display device is controlled to enter a first transitional display mode from the normal display mode; wherein, after the display device enters the first transitional display mode, for the same lamp group, the driving current of the LED lamp beads in the lamp group is smaller than the driving current when the display device is in the normal display mode, and larger than the driving current when the display device is in the anti-peeping display mode.

In this example, the display device is controlled to enter the first transitional display mode from the normal display mode in response to the first control instruction. After the display device enters the first transitional display mode, for the same lamp group 45, the driving current of the LED lamp beads 4321 in the lamp group 45 is smaller than the driving current when the display device 11 is in the normal display mode, and is larger than the driving current when the display device 11 is in the anti-peeping display mode.

For example, in the first direction F1, the driving current of the LED lamp beads 4321 in the lamp group 451 with the sequence number 1 and the driving current of the LED lamp beads 4321 in the lamp group 454 with the sequence number 16 decrease from the third driving current I3 to a fourth driving current, where the fourth driving current is smaller than the third driving current I3 and larger than the second driving current I2. In this way, the display area 121 with the sequence number 1 and the display area 124 with the sequence number 16 in the first direction F1 have a brightness lower than 800 nits and higher than 200 nits, such as 600 nits or 500 nits.

It should be noted that when entering the first transition display mode, only the driving current of the LED lamp beads 4321 in the lamp group that needs adjustment is adjusted. For example, in the first direction F1, the driving current of the LED lamp beads 4321 in the lamp group 45 with the sequence numbers 7, 8, 9, and 10 can remain unchanged.

In step 3022, the display device is controlled to enter the anti-peeping display mode from the first transition display mode.

In this example, controlling the display device to enter the anti-peeping display mode from the first transition display mode is similar to the method of controlling the display device to enter the anti-peeping display mode from the normal display mode in the foregoing examples, and will not be repeated here.

In this example, in response to the first control instruction, the display device enters the anti-peeping display mode from the normal display mode through the first transition display mode. In this way, discomfort to the eyes caused by excessive changes in the brightness of the display device can be avoided.

Figure 9:
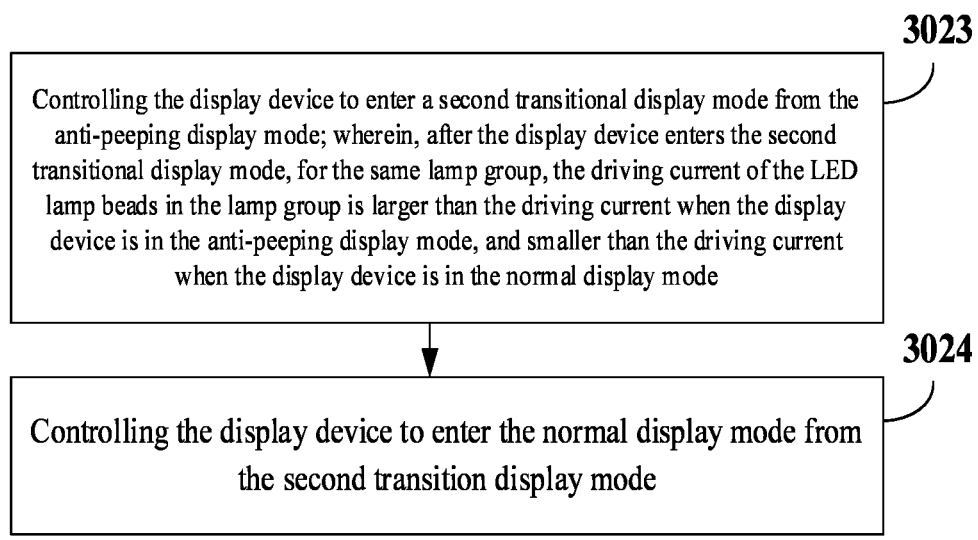
FIG. 9 is a flowchart of another control method for a display device according to an embodiment of the present disclosure.

An example of the present disclosure also provides a control method for the display device. In this example, as shown in FIG. 9, the above step 302 includes the following steps 3023 to 3024.

In step 3023, the display device is controlled to enter a second transitional display mode from the anti-peeping display mode; wherein, after the display device enters the second transitional display mode, for the same lamp group, the driving current of the LED lamp beads in the lamp group is larger than the driving current when the display device is in the anti-peeping display mode, and smaller than the driving current when the display device is in the normal display mode.

In this example, the display device is controlled to enter the second transitional display mode from the anti-peeping display mode in response to the second control instruction. After the display device enters the second transitional display mode, for the same lamp group, the driving current of the LED lamp beads in the lamp group is larger than the driving current when the display device is in the anti-peeping display mode, and is smaller than the driving current when the display device is in the normal display mode.

For example, in the first direction F1, the driving current of the LED lamp beads 4321 in the lamp group 451 with the sequence number 1 and the driving current of the LED lamp beads 4321 in the lamp group 454 with the sequence number 16 increase from the second driving current I2 to a fifth driving current. The fifth driving current is larger than the second driving current I2 and smaller than the third driving current I3. In this way, the display area 121 with the sequence number 1 and the display area 124 with the sequence number 16 in the first direction F1 have a brightness lower than 800 nits and higher than 200 nits, such as 600 nits or 500 nits. Here, the fifth driving current and the fourth driving current can be the same.

It should be noted that when entering the second transition display mode, only the driving current of the LED lamp beads 4321 in the lamp group that needs adjustment is adjusted. For example, in the first direction F1, the driving current of the LED lamp beads 4321 in the lamp group 45 with the sequence numbers 7, 8, 9, and 10 can remain unchanged.

In step 3024, the display device is controlled to enter the normal display mode from the second transition display mode.

In this example, controlling the display device to enter the normal display mode from the second transition display mode is similar to the method of controlling the display device to enter the anti-peeping display mode from the normal display mode in the foregoing examples, and will not be repeated here.

In this example, in response to the second control instruction, the display device enters the normal display mode from the anti-peeping display mode through the second transition display mode. In this way, discomfort to the eyes caused by excessive changes in the brightness of the display device can be avoided.

An example of the present disclosure also provides a display device. As shown in FIG. 1, the display device 11 includes a first edge B1, a second edge B2, N display areas 12, and a processing chip, where N is an integer larger than or equal to 3, and the N display areas 12 are disposed between the first edge B1 and the second edge B2 and arranged along a first direction F1; the extending direction of the first edge B1 and the extending direction of the second edge B2 respectively intersect with the first direction F1, and the first edge B1 and the second edge B2 are arranged along the first direction F1.

The processing chip is configured to control the display device 11 to enter the anti-peeping display mode in response to a first control instruction for entering the anti-peeping display mode. After the display device 11 enters the anti-peeping display mode, among the display areas 12 disposed between a central axis C of the display device 11 and the first edge B1, brightness of a display area 12 closer to the first edge B1 is lower than brightness of a display area 12 closer to the central axis C, and among the display areas 12 disposed between the central axis C and the second edge B2, brightness of a display area 12 closer to the second edge B2 is lower than brightness of a display area 12 closer to the central axis C, where the central axis C is parallel to the first edge B1.

In this example, the display device 11 includes a first edge B1, a second edge B2, and N display areas 12, the N display areas 12 are disposed between the first edge B1 and the second edge B2, and arranged along the first direction F1, where the extending direction of the first edge B1 and the extending direction of the second edge B2 intersect with the first direction F1 respectively, and the first edge B1 and the second edge B2 are arranged along the first direction F1, and the display device 11 enters the anti-peeping display mode in response to a first control instruction for entering the anti-peeping display mode. After the display device 11 enters the anti-peeping display mode, among the display areas 12 disposed between a central axis C of the display device 11 and the first edge B1, brightness of a display area 12 closer to the first edge B1 is lower than brightness of a display area 12 closer to the central axis C, and among the display areas 12 disposed between the central axis C and the second edge B2, brightness of a display area 12 closer to the second edge B2 is lower than brightness of a display area 12 closer to the central axis C, where the central axis C is parallel to the first edge B1. In other words, the brightness of the display area 12 closer to the edge of the display device 11 is lower than the brightness of the display area 12 closer to the center of the display device 11. Thereby, the purpose of anti-peeping can be achieved, the display content can be prevented from leaking, and the security of the display content can be improved. Moreover, without additional hardware, the thickness and weight of the display device can be prevented from increasing, which is beneficial to the thinning of the display device.

An embodiment of the present disclosure also provides a backlight module. The backlight module is applied to the display device described in any of the above-mentioned examples. The backlight module includes N backlight subareas. The N backlight subareas provide backlights for the N display areas 12 in a one-to-one correspondence. The N backlight subareas are disposed between the first edge B1 and the second edge B2 and are arranged along the first direction F1.

After the display device 11 enters the anti-peeping display mode, among the backlight subareas between the central axis C and the first edge B1, the brightness of the backlight subarea closer to the first edge B1 is lower than the brightness of the backlight subarea closer to the central axis C, and among the backlight subareas disposed between the central axis C and the second edge B2, the brightness of the backlight subarea closer to the second edge B2 is lower than the brightness of the backlight subarea closer to the central axis C.

In this example, the backlight module includes N backlight subareas, the N backlight subareas provide backlights for the N display areas 12 in a one-to-one correspondence, and the N backlight subareas are disposed between the first edge B1 and the second edge B2, and arranged along the first direction F1. In this way, by controlling the brightness of the backlight provided by the N backlight subareas, after the display device 11 enters the anti-peeping display mode, among the backlight subareas between the central axis C and the first edge B1, the brightness of the backlight subarea closer to the first edge B1 is lower than the brightness of the backlight subarea closer to the central axis C, and among the backlight subareas disposed between the central axis C and the second edge B2, the brightness of the backlight subarea closer to the second edge B2 is lower than the brightness of the backlight subarea closer to the central axis C, so that among the display areas 12 between the central axis C and the first edge B1, the brightness of the display area 12 closer to the first edge B1 is lower than the brightness of the display area 12 closer to the central axis C; and among the display areas 12 disposed between the central axis C and the second edge B2, the brightness of the display area 12 closer to the second edge B2 is lower than the brightness of the display area 12 closer to the central axis C. That is, the brightness of the display area 12 closer to the edge of the display device 11 is lower than the brightness of the display area 12 closer to the center of the display device 11. In this way, the purpose of anti-peeping can be realized, the display content can be prevented from leaking, and the security of the display content can be improved. Moreover, without additional hardware, the thickness and weight of the display device can be prevented from increasing, which is beneficial to the thinning of the display device.

Figure 10:
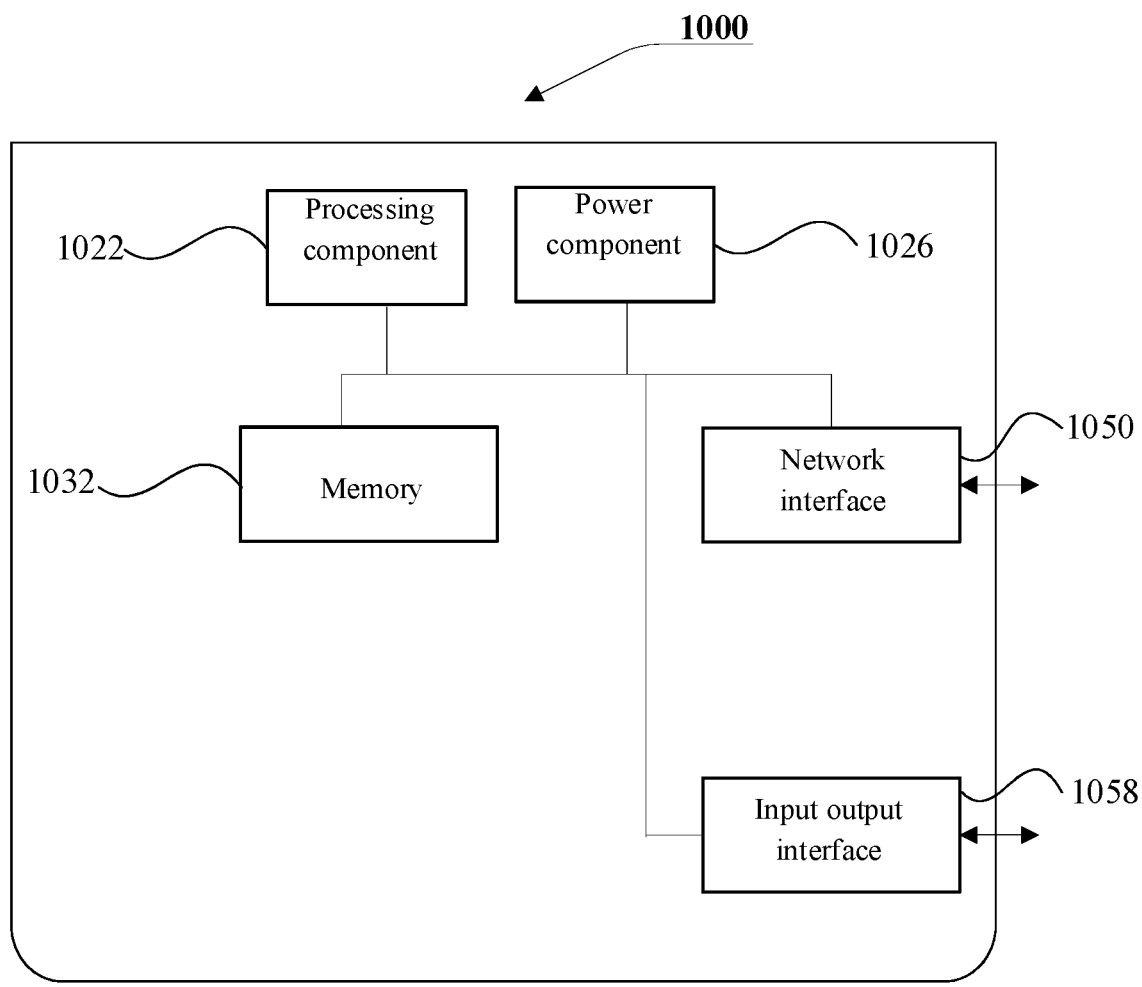
FIG. 10 is a block diagram of a display device according to an embodiment of the present disclosure.

FIG. 10 is a block diagram showing a display device according to an exemplary example. Referring to FIG. 10, the device 1000 includes a processing component 1022, which further includes one or more processors, and a memory resource represented by a memory 1032, for storing instructions executable by the processing component 1022, such as application programs. The application programs stored in the memory 1032 can include one or more modules each corresponding to a set of instructions. In addition, the processing component 1022 is configured to execute instructions to execute the above-mentioned control method for a display device.

The device 1000 can further include a power component 1026 configured to perform power management of the device 1000, a wired or wireless network interface 1050 configured to connect the device 1000 to a network, and an input output (I/O) interface 1058. The device 1000 can operate based on an operating system stored in the memory 1032, such as Windows Server™, Mac OS X™, Unix™, Linux™, FreeBSD™ or the like.

In an exemplary embodiment, there is also provided a non-transitory computer-readable storage medium including instructions, such as a memory 1032 including instructions, which can be executed by the processing component 1022 of the device 1000 to complete the above-mentioned control method for a display device. For example, the non-transitory computer-readable storage medium can be a ROM, a random access memory (RAM), a CD-ROM, a magnetic tape, a floppy disk, an optical data storage device, or the like.

It should be noted that the display device in this embodiment can be any product or component with display function, such as electronic paper, mobile phone, tablet computer, television, notebook computer, digital photo frame, navigator, or the like.

It should be pointed out that in the drawings, the sizes of layers and regions can be exaggerated for clarity of illustration. It will also be understood that when an element or layer is referred to as being "on" another element or layer, it can be directly on the other element or intervening layers can be present. In addition, it will be understood that when an element or layer is referred to as being "under" another element or layer, it can be directly under the other element, or there can be more than one intervening layer or element. In addition, it can also be understood that when a layer or element is referred to as being "between" two layers or two elements, it can be the only layer between the two layers or two elements, or more than one intervening layer or element can also be present. Similar reference numerals indicate similar elements throughout.

In the present disclosure, the terms "first" and "second" are only used for descriptive purposes, and cannot be understood as indicating or implying relative importance. The term "plurality" refers to two or more, unless specifically defined otherwise.

Other implementations of the present disclosure will be apparent to those skilled in the art from consideration of the specification and practice of the present disclosure herein. The present disclosure is intended to cover any variations, uses, modification or adaptations of the present disclosure that follow the general principles thereof and include common knowledge or conventional technical means in the related art that are not disclosed in the present disclosure. The specification and examples are considered as exemplary only, with a true scope and spirit of the present disclosure being indicated by the following claims.

It is to be understood that the present disclosure is not limited to the precise structure described above and shown in the accompanying drawings, and that various modifications and changes may be made without departing from the scope thereof. The scope of the present disclosure is limited only by the appended claims.

What is claimed is:

1. A control method for a display device, wherein the display device comprises a first edge, a second edge, and a number N of display areas, where N is an integer larger than or equal to 3, and the N display areas are disposed between the first edge and the second edge and arranged along a first direction; an extending direction of the first edge and an extending direction of the second edge respectively intersect with the first direction, and the first edge and the second edge are arranged along the first direction; the method comprises:

in response to a first control instruction for entering an anti-peeping display mode, controlling the display device to enter the anti-peeping display mode, wherein after the display device enters the anti-peeping display mode, among the display areas disposed between a central axis of the display device and the first edge, brightness of a display area closer to the first edge is lower than brightness of a display area closer to the central axis, and among the display areas disposed between the central axis and the second edge, brightness of a display area closer to the second edge is lower than brightness of a display area closer to the central axis, where the central axis is parallel to the first edge, wherein in response to a second control instruction for entering a normal display mode, the display device is controlled to enter the normal display mode, and after the display area enters the normal display mode, among the display areas disposed between the central axis and the first edge of the display device, the brightness of the display area closer to the first edge is higher than the brightness of the display area closer to the central axis; and among the display areas disposed between the central axis and the second edge, the brightness of the display area closer to the second edge is higher than the brightness of the display area closer to the central axis, wherein the display device comprises a backlight module, the backlight module comprises N backlight subareas, and the N backlight subareas provide backlights for the N display areas in a one-to-one correspondence, the N backlight subareas are disposed between the first edge and the second edge, and arranged along the first direction;

after the display device enters the anti-peeping display mode, among the backlight subareas between the central axis and the first edge, brightness of a backlight subarea closer to the first edge is lower than brightness of a backlight subarea closer to the central axis, and among the backlight subareas disposed between the central axis and the second edge, brightness of a backlight subarea closer to the second edge is lower than brightness of a backlight subarea closer to the central axis;

after the display device enters the normal display mode, among the backlight subareas disposed between the central axis and the first edge, brightness of a backlight subarea closer to the first edge is higher than brightness of a backlight subarea closer to the central axis, and among the backlight subareas disposed between the central axis and the second edge, brightness of a backlight subarea closer to a second edge is higher than brightness of a backlight subarea closer to the central axis, wherein the backlight module is an edge-type backlight module, the display device comprises a third edge, and the third edge extends along the first direction, the edge-type backlight module comprises a light bar, the light bar is disposed on one side of the third edge of the display device and extends along the first direction, the light bar comprises a plurality of LED lamp beads, the plurality of LED lamp beads are divided into N lamp groups, and the N lamp groups provide backlight for the N backlight subareas in a one-to-one correspondence; all the LED lamp beads in the same lamp group are connected in series, driving currents for all the LED lamp beads in the same lamp group are the same; and the N lamp groups are connected in parallel, or, wherein the backlight module is a direct-type backlight module, and the direct-type backlight module comprises a plurality of LED lamp beads arranged in an array along the first direction and a third direction, where the third direction intersects with the first direction; the plurality of LED lamp beads are divided into N lamp groups, and the N lamp groups provide backlights for the N backlight subareas in a one-to-one correspondence; the N lamp groups are arranged along the first direction; driving currents for all the LED lamp beads in the lamp group are the same, wherein after the display device enters the anti-peeping display mode, the driving currents of the LED lamp beads in the N lamp groups satisfies following first curve equation:

$$I = -\frac{21.6}{(N-1)^2}x^2 + \frac{21.6(N+1)}{(N-1)^2}x + 3.6 - \frac{21.6N}{(N-1)^2}$$

after the display device enters the normal display mode, the driving currents of the LED lamp beads in the N lamp groups satisfies following second curve equation:

$$I = \frac{22.48}{(N-1)^2}x^2 - \frac{22.48(N+1)}{(N-1)^2}x + 14.62 + \frac{22.48N}{(N-1)^2}$$

where I is a current, x is a sequence number of the lamp group in the first direction, and x is 1, 2, 3, . . . , N;

N is an even number, and two lamp groups with sequence numbers N/2 and N/2+1 in the first direction are respectively disposed on two sides of the central axis;

after the display device enters the anti-peeping display mode, the driving currents of the LED lamp beads in the two lamp groups with the sequence numbers N/2 and N/2+1 in the first direction are the same, and both are a first driving current, the driving currents of the LED lamp beads in the two lamp groups with sequence numbers 1 and N in the first direction are the same, and both are a second driving current; the second driving current is smaller than the first driving current;

after the display device enters the normal display mode, the driving currents of the LED lamp beads in the two lamp groups with the sequence numbers N/2 and N/2+1 in the first direction are the same, and both are the first driving current, the driving currents of the LED lamp beads in the two lamp groups with the sequence numbers 1 and N in the first direction are the same, and both are a third driving current; the third driving current is larger than the first driving current.

2. The control method for a display device of claim 1, wherein after the display device enters the anti-peeping display mode, the brightness of the display areas disposed between the central axis and the first edge decreases sequentially along a second direction, and the brightness of the display areas disposed between the central axis and the second edge decreases sequentially along the first direction, where the first direction is a direction from the first edge to the second edge, and the second direction is the opposite direction of the first direction.

3. The control method for a display device of claim 1, wherein after the display device enters the normal display mode, the brightness of the display areas disposed between the central axis and the first edge increases sequentially along a second direction, and the brightness of the display areas disposed between the central axis and the second edge increases sequentially along the first direction, where the first direction is a direction from the first edge to the second edge, and the second direction is the opposite direction of the first direction.

4. The control method for a display device of claim 1, wherein before the response to the first control instruction for entering the anti-peeping display mode, the method further comprises:
   in response to a first switching operation of switching the normal display mode to the anti-peeping display mode, generating the first control instruction;
   controlling the display device to enter the anti-peeping display mode comprises:
   controlling the display device to enter a first transitional display mode from the normal display mode; wherein, after the display device enters the first transitional display mode, for the same lamp group, the driving current of the LED lamp beads in the lamp group is smaller than the driving current when the display device is in the normal display mode, and larger than the driving current when the display device is in the anti-peeping display mode; and
   controlling the display device to enter the anti-peeping display mode from the first transitional display mode.

5. The control method for a display device of claim 1, wherein before the response to the second control instruction for entering the normal display mode, the method further comprises:
   in response to a second switching operation of switching the anti-peeping display mode to the normal display mode, generating the second control instruction;
   controlling the display device to enter the normal display mode comprises:
   controlling the display device to enter a second transitional display mode from the anti-peeping display mode; wherein, after the display device enters the second transitional display mode, for the same lamp group, the driving current of the LED lamp beads in the lamp group is larger than the driving current when the display device is in the anti-peeping display mode, and smaller than the driving current when the display device is in the normal display mode;
   controlling the display device to enter the normal display mode from the second transitional display mode.

6. The control method for a display device of claim 1, wherein the display device further comprises a display panel and an anti-peeping film, the anti-peeping film is disposed between the backlight module and the display panel;
   after the display device enters the anti-peeping display mode, a ratio of brightness of a 45° viewing angle to brightness of a 0° viewing angle of the display device is lower than or equal to 0.75%.

7. A display device, comprising a first edge, a second edge, a number N of display areas, and a processing chip, where N is an integer larger than or equal to 3, wherein the N display areas are disposed between the first edge and the second edge and arranged along a first direction; an extending direction of the first edge and an extending direction of the second edge intersect with the first direction respectively, and the first edge and the second edge are arranged along the first direction;
   the processing chip is configured to control the display device to enter an anti-peeping display mode in response to a first control instruction for entering the anti-peeping display mode, wherein after the display device enters the anti-peeping display mode, among the display areas disposed between a central axis of the display device and the first edge, brightness of a display area closer to the first edge is lower than brightness of a display area closer to the central axis, and among the display areas disposed between the central axis and the second edge, brightness of a display area closer to the second edge is lower than brightness of a display area closer to the central axis, where the central axis is parallel to the first edge,
   wherein in response to a second control instruction for entering a normal display mode, the display device is controlled to enter the normal display mode, and after the display area enters the normal display mode, among the display areas disposed between the central axis and the first edge of the display device, the brightness of the display area closer to the first edge is higher than the brightness of the display area closer to the central axis; and among the display areas disposed between the central axis and the second edge, the brightness of the display area closer to the second edge is higher than the brightness of the display area closer to the central axis,
   wherein the display device comprises a backlight module, the backlight module comprises N backlight subareas, and the N backlight subareas provide backlights for the N display areas in a one-to-one correspondence, the N backlight subareas are disposed between the first edge and the second edge, and arranged along the first direction;
   after the display device enters the anti-peeping display mode, among the backlight subareas between the central axis and the first edge, brightness of a backlight subarea closer to the first edge is lower than brightness of a backlight subarea closer to the central axis, and among the backlight subareas disposed between the central axis and the second edge, brightness of a backlight subarea closer to the second edge is lower than brightness of a backlight subarea closer to the central axis;
   after the display device enters the normal display mode, among the backlight subareas disposed between the central axis and the first edge, brightness of a backlight subarea closer to the first edge is higher than brightness of a backlight subarea closer to the central axis, and among the backlight subareas disposed between the central axis and the second edge, brightness of a backlight subarea closer to a second edge is higher than brightness of a backlight subarea closer to the central axis,
   wherein the backlight module is an edge-type backlight module, the display device comprises a third edge, and the third edge extends along the first direction, the edge-type backlight module comprises a light bar, the light bar is disposed on one side of the third edge of the display device and extends along the first direction, the light bar comprises a plurality of LED lamp beads, the plurality of LED lamp beads are divided into N lamp groups, and the N lamp groups provide backlight for the N backlight subareas in a one-to-one correspondence; all the LED lamp beads in the same lamp group are connected in series, driving currents for all the LED lamp beads in the same lamp group are the same; and the N lamp groups are connected in parallel, or, wherein the backlight module is a direct-type backlight module, and the direct-type backlight module comprises a plurality of LED lamp beads arranged in an array along the first direction and a third direction, where the third direction intersects with the first direction; the plurality of LED lamp beads are divided into N lamp groups, and the N lamp groups provide backlights for the N backlight subareas in a one-to-one correspondence; the N lamp groups are arranged along the first direction; driving currents for all the LED lamp beads in the lamp group are the same, wherein after the display device enters the anti-peeping display mode, the driving currents of the LED lamp beads in the N lamp groups satisfies following first curve equation:

$$I = -\frac{21.6}{(N-1)^2}x^2 + \frac{21.6(N+1)}{(N-1)^2}x + 3.6 - \frac{21.6N}{(N-1)^2}$$

after the display device enters the normal display mode, the driving currents of the LED lamp beads in the N lamp groups satisfies following second curve equation:

$$I = \frac{22.48}{(N-1)^2}x^2 - \frac{22.48(N+1)}{(N-1)^2}x + 14.62 + \frac{22.48N}{(N-1)^2}$$

where I is a current, x is a sequence number of the lamp group in the first direction, and x is 1, 2, 3, ..., N;

N is an even number, and two lamp groups with sequence numbers N/2 and N/2+1 in the first direction are respectively disposed on two sides of the central axis;

after the display device enters the anti-peeping display mode, the driving currents of the LED lamp beads in the two lamp groups with the sequence numbers N/2 and N/2+1 in the first direction are the same, and both are a first driving current, the driving currents of the LED lamp beads in the two lamp groups with sequence numbers 1 and N in the first direction are the same, and both are a second driving current; the second driving current is smaller than the first driving current;

after the display device enters the normal display mode, the driving currents of the LED lamp beads in the two lamp groups with the sequence numbers N/2 and N/2+1 in the first direction are the same, and both are the first driving current, the driving currents of the LED lamp beads in the two lamp groups with the sequence numbers 1 and N in the first direction are the same, and both are a third driving current; the third driving current is larger than the first driving current.

8. A backlight module, applied to the display device of claim 7, wherein the backlight module comprises a number N of backlight subareas, and the N backlight subareas provide backlights for the N display areas in a one-to-one correspondence, and the N backlight subareas are disposed between the first edge and the second edge, and are arranged along the first direction;

after the display device enters the anti-peeping display mode, among the backlight subareas disposed between the central axis and the first edge, brightness of a backlight subarea closer to the first edge is lower than brightness of a backlight subarea closer to the central axis, and among the backlight subareas disposed between the central axis and the second edge, brightness of a backlight subarea closer to the second edge is lower than brightness of a backlight subarea closer to the central axis.

* * * * *